A. BURGESS.
Magazine Fire-Arm.
No. 213,868. Patented April 1, 1879.
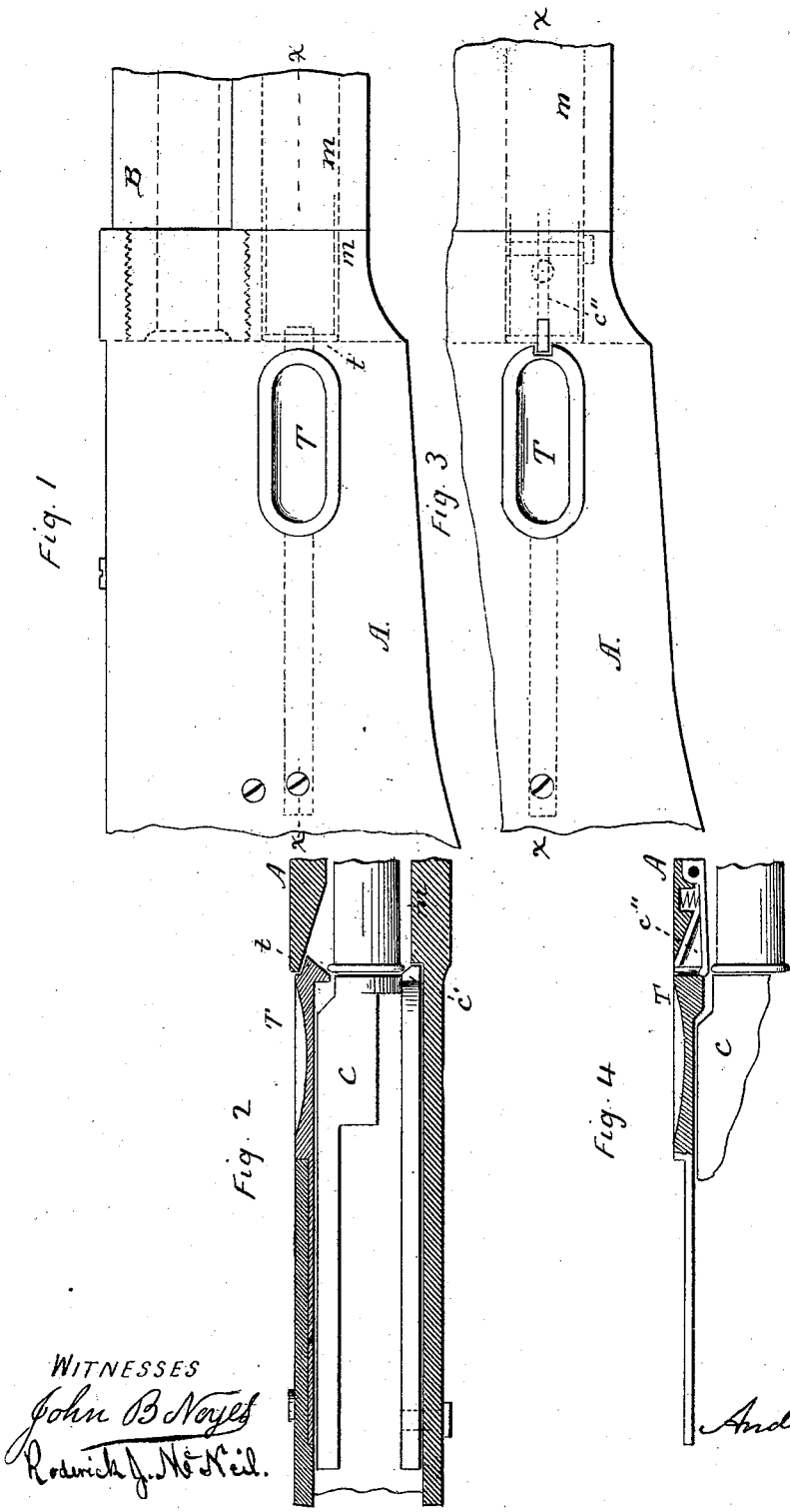
WITNESSES
John B. Noyes
Roderick J. McNeil
Inventor
Andrew Burgess

UNITED STATES PATENT OFFICE.

ANDREW BURGESS, OF OWEGO, NEW YORK.

IMPROVEMENT IN MAGAZINE FIRE-ARMS.

Specification forming part of Letters Patent No. 213,868, dated April 1, 1879; application filed December 21, 1878.

*To all whom it may concern:*

Be it known that I, ANDREW BURGESS, of Owego, county of Tioga, and State of New York, have invented a new and useful Improvement in Magazine Fire-Arms, of which the following, in connection with the accompanying drawings, is a specification.

Similar letters of reference indicate corresponding parts.

Figure 1 is a side view of the frame of an arm, showing the magazine and inclined projection $t$ in broken lines. Fig. 2 is a longitudinal section taken on the horizontal line $x$ $x$, and shows the bottom of the carrier. Fig. 3 is a modification of the loading device, of which Fig. 4 shows a section.

The well-known trap T is prolonged forward by the incline $t$, and applied to an opening in the frame, which leads direct into the delivery end of the magazine.

As the trap or cover T has heretofore been constructed with a squared front end, which did not reach forward of the butt of a cartridge, if it is moved forward to the position here shown, so that the cartridges, in moving back from the magazine onto the carrier, must pass back of the front end of said trap, they are liable to catch on the square end of the trap or force themselves under the carrier, this rendering their delivery from the magazine to the carrier uncertain or inoperative.

To prevent the cartridges from catching, and to effectually stop them in the magazine, I form the trap T with the incline $t$ formed at such an angle as not to catch or stop the cartridge by itself, but merely to glance its head toward the other side of the magazine, where it is stopped by a projection or by the face of the carrier, and when the trap is pressed down to load the magazine the incline $t$ cams or presses forward the cartridge or follower in the magazine.

A corresponding incline, $c'$, may be formed on the face of the carrier, or on the frame opposite the incline $t$ of the trap, to support the cartridge-head as it is pressed down upon it and forward by the opposite incline, or, in conjunction therewith, to stop the cartridge in the magazine.

In the modification shown in Figs. 3 and 4, I am enabled to use a blunt-ended trap in the position shown by arranging a laterally-oscillating spring arm or foil, $c''$, at the end of said trap, to prevent the cartridges from lodging against it by keeping them in the center or toward the other side of the magazine, and the cartridges being stopped by the carrier at or just ahead of the front end of the trap, it allows said trap to move in and out without moving the cartridge, and when the cartridges are loaded through the aperture they pass under the foil $c''$, and press it up to allow them to enter the magazine.

By the above devices, and by moving the loading-orifice forward, as described, the magazine may be charged in front of the carrier, or when the carrier is in its raised position.

Having thus described my invention, what I claim as new, and desire to secure by Letters Patent, is—

1. A frame of a magazine fire-arm provided with a loading-aperture at the side of the mouth of the magazine, a trap or gate to cover such aperture, and having the incline $t$ to deflect the cartridge and stop it against an opposite stop or a projection on the carrier, all in combination, substantially as described.

2. The inclined end of spring T, in combination with the inclined portion $c'$ on the opposite side of the frame or carrier, substantially as specified.

ANDREW BURGESS.

Witnesses:
ANDREW O'NEILL,
A. HEATON ROBERTSON.